(12) United States Patent
Sundaresan et al.

(10) Patent No.: US 9,626,682 B2
(45) Date of Patent: Apr. 18, 2017

(54) SYSTEMS AND METHODS FOR RESELLER DISCOVERY AND ANALYSIS

(71) Applicants: Neelakantan Sundaresan, Mountain View, CA (US); Zeqian Shen, San Jose, CA (US); Yuchen Zhao, Chicago, IL (US)

(72) Inventors: Neelakantan Sundaresan, Mountain View, CA (US); Zeqian Shen, San Jose, CA (US); Yuchen Zhao, Chicago, IL (US)

(73) Assignee: eBay Inc., San Jose, CA (US)

( * ) Notice: Subject to any disclaimer, the term of this patent is extended or adjusted under 35 U.S.C. 154(b) by 781 days.

(21) Appl. No.: 13/627,559

(22) Filed: Sep. 26, 2012

(65) Prior Publication Data

US 2013/0204729 A1 Aug. 8, 2013

Related U.S. Application Data

(60) Provisional application No. 61/596,655, filed on Feb. 8, 2012.

(51) Int. Cl.
*G06Q 30/00* (2012.01)
(52) U.S. Cl.
CPC .................................. *G06Q 30/00* (2013.01)
(58) Field of Classification Search
CPC ..................................................... G06Q 30/00
See application file for complete search history.

(56) References Cited

U.S. PATENT DOCUMENTS

| | | | | |
|---|---|---|---|---|
| 7,614,547 | B2 * | 11/2009 | Kotas | G06Q 30/02 235/376 |
| 8,090,642 | B1 * | 1/2012 | Van Doren et al. | 705/37 |
| 8,489,464 | B1 * | 7/2013 | Parihar et al. | 705/26.1 |
| 8,650,090 | B2 * | 2/2014 | Altschuler | 705/26.1 |
| 2003/0204447 | A1 * | 10/2003 | Dalzell et al. | 705/26 |
| 2003/0204449 | A1 * | 10/2003 | Kotas | G06Q 30/02 707/781 |

(Continued)

OTHER PUBLICATIONS

Hughes, Elaine; :Online resale business worries retailers ; some stores limit amount of one item a customer at one time, USA Today, Aug. 1, 2007.*

*Primary Examiner* — Mark Fadok
(74) *Attorney, Agent, or Firm* — Schwegman, Lundberg & Woessner, P.A.

(57) ABSTRACT

Methods and systems relating to a reseller analysis tool are described. In some embodiments, electronic commerce transaction information associated with a plurality of electronic commerce transactions occurring using an electronic commerce system is received at the electronic commerce system. A set of resale transactions from the plurality of electronic commerce transactions is identified using the electronic commerce transaction information, including identifying the set of resale transactions based on resale criteria capable of indicating a sale of an item by an entity that previously purchased the item using the electronic commerce transaction system. A set of rules associated with resale transactions is generated, including generating the set of rules based on the electronic commerce transaction information associated with the set of resale transactions. Based on the set of rules, user transaction information relevant to a transaction associated with a user is provided.

22 Claims, 6 Drawing Sheets

(56) References Cited

U.S. PATENT DOCUMENTS

| | | | |
|---|---|---|---|
| 2005/0177443 A1* | 8/2005 | Rodriguez | G06Q 30/08 |
| | | | 705/26.3 |
| 2007/0282686 A1* | 12/2007 | Walker | G06Q 10/02 |
| | | | 705/14.17 |
| 2008/0154761 A1* | 6/2008 | Flake et al. | 705/37 |
| 2008/0228592 A1* | 9/2008 | Kotas | G06Q 30/02 |
| | | | 235/376 |
| 2011/0040656 A1* | 2/2011 | Groetzinger et al. | 705/27.1 |
| 2011/0125538 A1* | 5/2011 | Joao | G06Q 10/02 |
| | | | 705/5 |
| 2011/0246325 A1* | 10/2011 | Altschuler | 705/26.61 |
| 2011/0302009 A1* | 12/2011 | Freed | G06Q 30/0601 |
| | | | 705/14.16 |
| 2012/0136990 A1* | 5/2012 | Denker et al. | 709/224 |
| 2012/0143710 A1* | 6/2012 | Altschuler | 705/26.1 |
| 2012/0185394 A1* | 7/2012 | Gelfand et al. | 705/44 |

* cited by examiner

SYSTEMS AND METHODS FOR RESELLER DISCOVERY AND ANALYSIS

CROSS-REFERENCE TO RELATED APPLICATIONS

This application claims the benefit of U.S. Provisional Application No. 61/374,195, filed Feb. 8, 2012, which is incorporated herein by reference in its entirety.

TECHNICAL FIELD

The present disclosure generally relates to network communications and, more specifically, to systems and methods relating to a reseller analysis tool.

BACKGROUND

In online publication systems, products or services may be offered for sale and/or purchased by users. Users with experience in such systems may be more knowledgeable than newer users about how to buy and/or sell these products and services. For example, an experienced user selling a product may have more knowledge about how to advertise a product for sale such that the advertisement will result in a successful sale of the product, while a less experienced user may advertise the same product in a less appealing manner which may perhaps negatively affect the results of the sale of the product.

BRIEF DESCRIPTION OF THE DRAWINGS

Some embodiments are illustrated by way of example and not limitation in the figures of the accompanying drawings.

DETAILED DESCRIPTION

Example systems and methods relating to a reseller analysis tool are described. In the following description, for purposes of explanation, numerous specific details are set forth in order to provide a thorough understanding of example embodiments. It will be evident, however, to one skilled in the art that the present technology may be practiced without these specific details.

A reseller analysis tool may be provided to users of online publication systems such that user transaction information may be provided to a user. User transaction information may be any information which may be relevant to a particular transaction of a user. In some embodiments, the user transaction information may include information which may be helpful to the user when the user is deciding whether to proceed with a particular transaction. For example, if the user is creating an advertisement for the sale of a textbook on an online publication system, the reseller analysis tool may provide user transaction information relating to a recommended price at which to sell the textbook or a recommendation to provide an image of the textbook with the advertisement. In some embodiments, the user transaction information may be provided in response to a request for the information from the user The user transaction information may be relevant to any type of transaction which may occur or potentially occur through the online publication system. Examples of transactions include the sale of a particular item (or product, service, etc.), the potential sale of a particular item (e.g., an advertisement of an item for sale that a user is in the process of posting on the online publication system), the purchase of a particular item, the potential purchase of a particular item (e.g., an advertisement of an item for sale that a user is viewing while browsing the online publication system), and the like.

The reseller analysis tool may provide user transaction information based on transaction information collected and analyzed for various transactions occurring through the online publication system. The reseller analysis tool may apply resale criteria to information associated with transactions occurring on the online publication system. The resale criteria may be capable of identifying resale transactions from the transaction information received. A resale transaction may be a transaction occurring through an online publication system and that is associated with the sale of an item, product, or service by an entity that previously purchased the item, product, or service using the online publication system. For example, if a user purchases an item through the online publication system and subsequently sells the same item through the online publication system, the subsequent sale of the item would constitute a resale transaction by the user. Once resale transactions have been identified, information associated with the resale transactions is gathered and analyzed to generate rules associated with resale transactions. The rules associated with resale transactions may be any rules which define occurrences, details, behaviors, trends, and the like of resale transactions. These rules may be used to generate and provide user transaction information relevant to a transaction associated with a user. For example, based on gathered and analyzed resale information associated with resale transactions, the reseller analysis tool may determine that textbooks generally sell for higher prices during the month of August than during the month of May. This determined rule may be used to generate user transaction information for a user who is selling textbooks in May. For instance, the user transaction information provided to the user may recommend that the seller wait until August to sell the textbook so that the seller may receive a higher price for the textbook than would be received in May.

Figure 1:
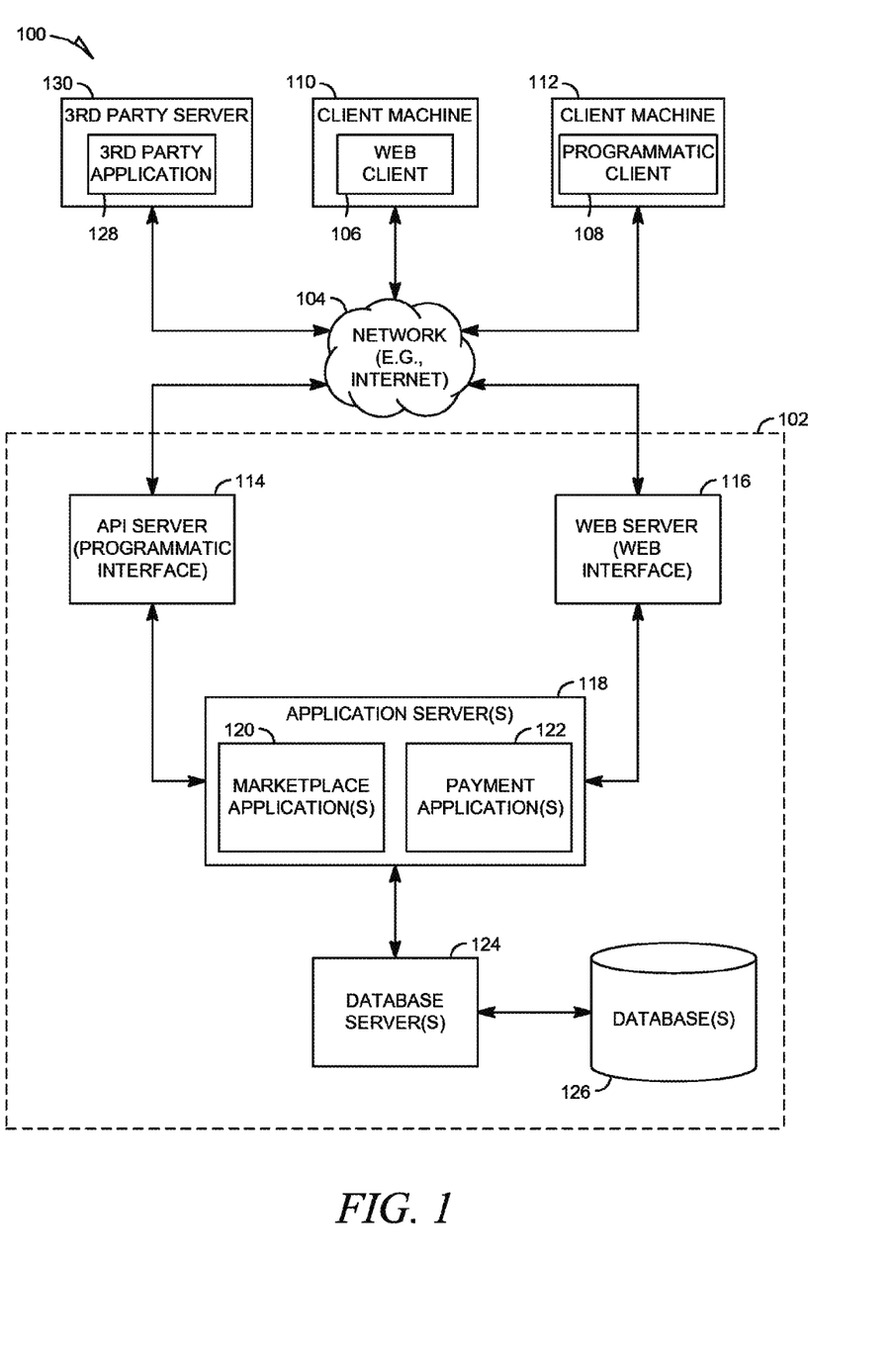
FIG. 1 is a network diagram depicting an example client-server system within which a reseller analysis tool may be deployed, according to some embodiments.

FIG. 1 is a network diagram depicting an example client-server system 100 within which a reseller analysis tool may be deployed. A networked system 102, in the example forms of a network-based marketplace or publication system, provides server-side functionality, via a network 104 (e.g., the Internet, Wide Area Network (WAN), etc.) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments of the present invention is of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable setters to author and manage listings on the networked system 102 in an off-line manner, and to perform batch-mode communications between the programmatic client 108 and the networked system 102.

FIG. 1 also illustrates a third-party application 128, executing on a third-party server machine 130, as having programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more promotional, marketplace, or payment functions that are supported by the relevant applications of the networked system 102.

Figure 2:
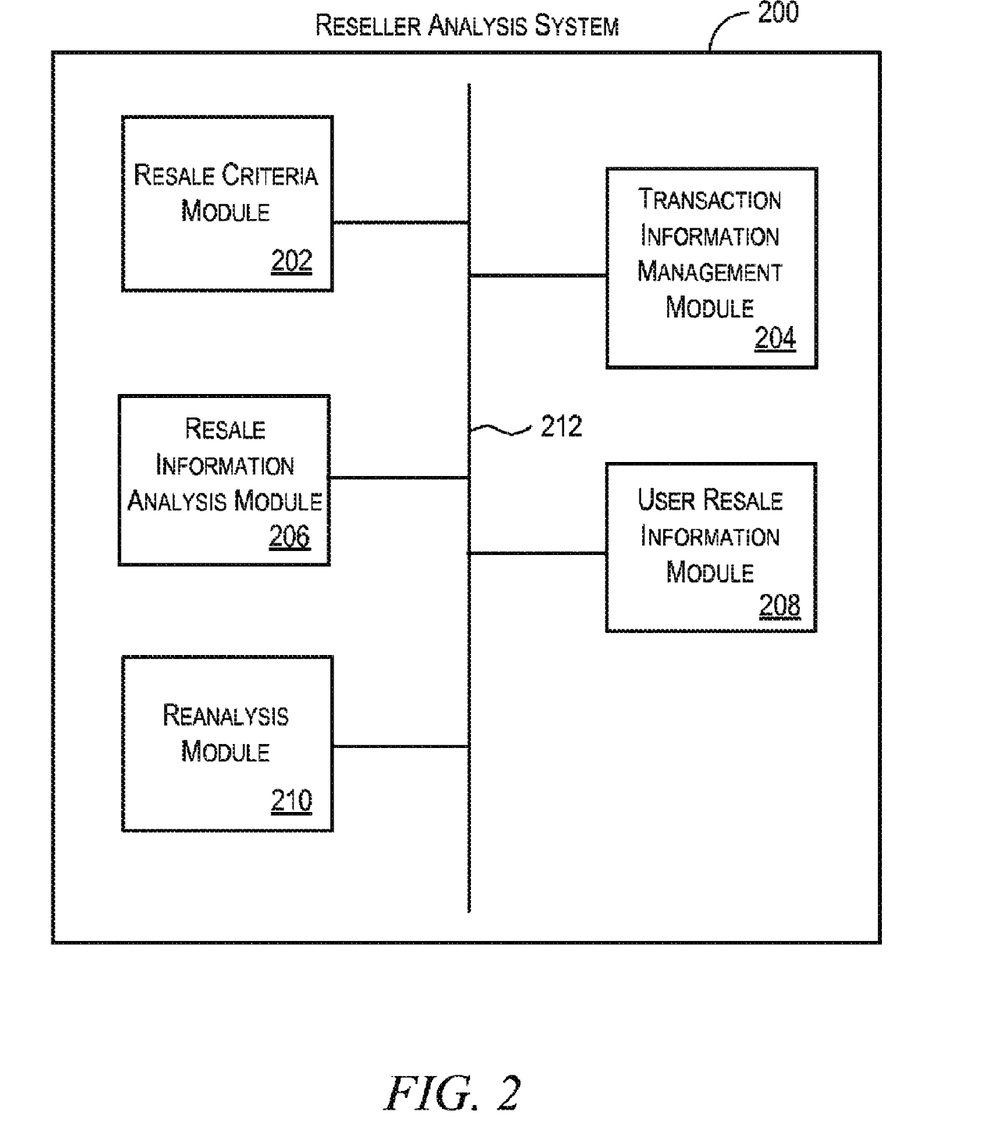
FIG. 2 is a block diagram of example components of a reseller analysis system, according to some embodiments.

FIG. 2 is a block diagram of example components of a reseller analysis system 200, which may be a system within the networked system 102 of FIG. 1. In some embodiments, the reseller analysis system 200 may be included application servers 118 of FIG. 1. In various embodiments, the reseller analysis system 200 may implement computer programs, logic, applications, methods, processes, or software to provide user transaction information relevant to a particular transaction. The components of the reseller analysis system 200 may include components such as the resale criteria module 202, the transaction information management module 204, the resale information analysis module 206, the user resale information module 208, and the reanalysis module 210. A communication bus 212 may be coupled to the various modules and components in the reseller analysis system 200, thereby allowing the modules and components to communicate with one another. Communication bus 212 may use any communication protocol and any communication media.

The resale criteria module 202 may be a hardware-implemented module which may be configured to set, identify, adjust, and/or manage resale criteria capable of identifying resale transactions from the transactions occurring on the online publication system. In some embodiments, the resale criteria may be set manually based on known characteristics of resale transactions. In some embodiments, the resale criteria may be automatically adjusted based on machine-learning techniques for determining and correcting errors in identification of a resale transaction.

The transaction information management module 204 may be a hardware-implemented module which may be configured to receive, monitor, and/or manage transaction information associated with transactions occurring through the online publication system. As transactions occur through the online publication system, the transaction information management module 204 may collect information associated with those transactions.

The resale information analysis module 206 may be a hardware-implemented module which may be configured to mine and analyze the transaction information received at the transaction information management module 204 to determine which of the transactions occurring on the online publication system are resale transactions. Resale transactions may be identified using the resale criteria managed by the resale criteria module 202. Once the resale transactions (and any information associated with the resale transactions) have been determined and the information collected, the resale information analysis module 206 may analyze the information to generate rules associated with resale transactions, which may be any rules that define occurrences, details, behaviors, trends, and the like of resale transactions.

The user resale information module 208 may be a hardware-implemented module which may be configured to use the resale transaction rules generated by the resale information analysis module 206 to generate and provide user transaction information to a client device of a user. The user resale information module 208 may determine that a user is engaged in the process of a transaction on the online publication system and may use information about the user's transaction to generate and provide user transaction information relevant to the user's transaction. In some embodiments, the user resale information module 208 may provide the user transaction information in response to a request received from the client device of the user.

The reanalysis module 210 may be a hardware-implemented module which may be configured to monitor a user's response to user transaction information provided by the user resale information module 208 to analyze and identify the effectiveness of the user transaction information. Based on the analysis and identification, the reanalysis module 210 may adjust any criteria, factors, and the like that may be used to generate the user transaction information provided, including adjusting the resale criteria, factors and generalizations used in determining rules associated with resale transactions, and the like.

Figure 3:
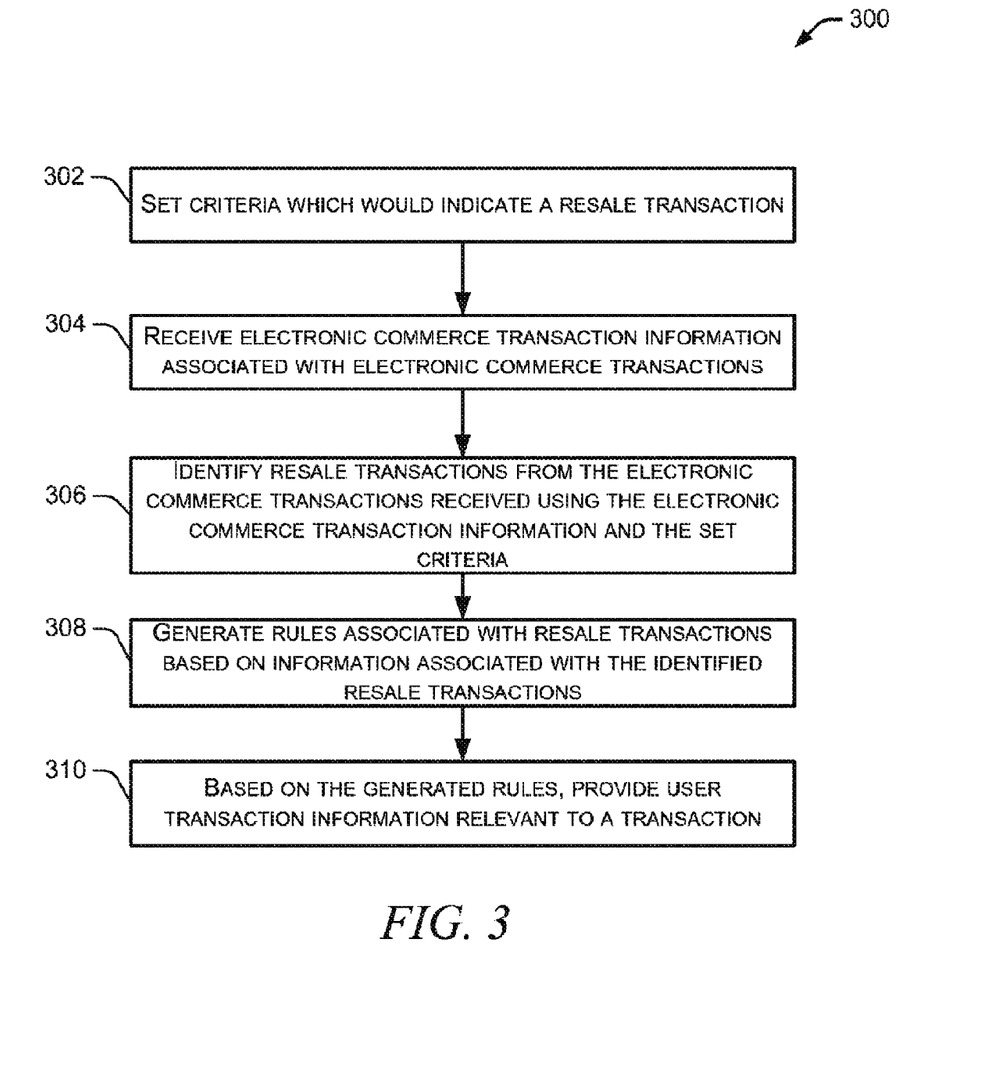
FIG. 3 is a flow chart showing an example method of providing user transaction information, according to some embodiments.

FIG. 3 is a flow chart showing an example method 300 of providing user transaction information. The method 300 may be performed using the reseller analysis system 200 of the online publication system, as shown in FIG. 2.

In operation 302, the resale criteria module 202 sets resale criteria which would indicate a resale transaction. As described above, the resale criteria may be any criteria capable of identifying resale transactions from the transactions occurring on the online publication system. The entity reselling the item may be an individual user or an entity with one or more users associated with a common group (e.g., members of a company, organization, family, household, etc.).

In some embodiments, resale criteria may be set to identify a transaction in which an item is being sold by an entity on the online publication system, where that item was previously purchased by the same entity on the online publication system. For example, resale criteria may define a resale transaction to be a transaction which a user (User A) bought an item X and sold an item Y, where item X and item Y are part of different transactions but refer to the same item and where the purchase time of item X is earlier than the purchase time of item Y.

In some embodiments, resale criteria may be set to identify a resale transaction while accounting for multiple users who are part of a common entity. For example, the resale criteria may account for the idea that an item purchased by one user and subsequently sold by a different user may still be considered a resale of the item if the two users are operating under a common group (e.g., as a single entity). In this scenario, resale criteria may define a resale transaction to be a transaction in which a user (User A) bought an item X, and another user (User B) sold an item Y, where item X and item Y are part of different transactions but refer to the same item, where the purchase time of item X is earlier than the purchase time of item Y, and where User A and User B are part of a common entity. Common entities may be determined in any manner, and the resale criteria may be set to include any factors used to determine common entities. For example, users may belong to a common entity if they have the same billing and/or shipping address, if they have the same last names, if they pay for items from a common payment account, if they exhibit similar user transaction behaviors, and the like or any combination thereof. In some embodiments, entities including multiple users may be associated with a unique entity identifier, and each user that is part of that entity may be associated with the unique entity identifier.

In some embodiments, resale criteria may incorporate similarity matching techniques to determine whether an item previously purchased is the same item sold in a subsequent transaction. For example, a user (User A) may purchase item X, where item X was advertised using a particular description (Description X). When User A subsequently sells item X, User A may advertise item X using a description (Description Y) that is not identical to Description X. In this case, the resale criteria may utilize similarity matching techniques such that the resale criteria is capable of identifying that the subsequent sale of item X using Description Y is a sale of the same item described in Description X. The similarity matching may compare any elements of the descriptions of the items (e.g., titles, text describing the item, images, etc.) and/or disregard any surplus information (e.g., refund policies, shipping charges, etc.). Any elements of the descriptions may be compared to determine if the descriptions are similar enough to constitute a likely resale of an item (e.g., number of similar words, number of unique words, etc.). If the two descriptions of the items are equal to or greater than a predetermined similarity threshold, the subsequent sale of the item may be determined to be a resale of the previously purchased item. In some embodiments, these similarity matching techniques may also be utilized to account for a likelihood that two users are part of a common entity.

In operation 304, the transaction information management module 204 receives and stores electronic commerce transaction information associated with electronic commerce transactions. The transaction information of a transaction may be any information relevant to or associated with the transaction, including the type of item purchased or sold in the transaction, the transaction time, the price at which the item was purchased or sold, and the like.

In operation 306, the resale information analysis module 206 identifies resale transactions from the electronic commerce transactions received using the electronic commerce transaction information and the set criteria. As transaction information of transactions occurring on the online publication system is received, the information may be analyzed to identify which of those transactions are resale transactions. The analysis includes applying the resale criteria to the transaction information to determine which transactions are resale transactions, including determining resale transactions based on common entities (e.g., using the entity identifier), similarity matching techniques of item descriptions and users, and the like.

In operation 308, the resale information analysis module 206 generates rules associated with resale transactions based on information associated with the identified resale transactions. The resale information analysis module 206 may use the transaction information associated with the identified resale transactions to identify characteristics associated with resale transaction, such as identifying patterns associated with resale transactions, key features of resale transitions, and the like. The resale information analysis module 206 may use the identified characteristics associated with resale transactions to determine and generate rules such as generalizations relating to why a user may resell items, predictions relating to whether a particular item or a particular category of items would result in a successful resale transaction, predictions relating to transaction characteristics which would result in a successful resale (e.g., optimal sale price, optimal item description, etc.), geography-specific generalizations relating resale transactions (e.g., why some resale transactions result in a more successful transaction in one geographical location as opposed to a different geographical location), correlations between a seller's rating or feedback from other users and the rate of success of a resale transaction, generalizations relating to the amount of time between an entity's purchase of the item and the resale of the item, generalizations relating to reasons why a particular item is able to be resold for a higher price than it was originally purchased for, characteristics of a description of an item which resulted in a successful resale (e.g., stating that an item is "new" versus "brand new," added descriptions relating to color or functions of the item, including images of the item, image quality of the item, etc.), generalizations relating to whether shipping costs affect a successful resale, and the like. For example, the resale information analysis module 206 may generate a rule which generally specifies that a textbook may be more successfully resold at the end of the summer season (e.g., may sell for a higher price) than at the beginning of the summer season.

In operation 310, the user resale information module 208, based on the rules generated in operation 308, generates and provides user transaction information relevant to a transaction. The user transaction information may be provided automatically or in response to a request from the user, and the user transaction information may be provided to the client device of the user in any manner (e.g., via email, text message, in a webpage associated with the online publication system, etc.). The user resale information module 208 may determine a user transaction occurring or about to occur (e.g., a seller transaction or potential transaction, a buyer transaction or potential transaction, etc.), including determining characteristics, details, specifics, and the like associated with the transaction (e.g., transaction description, type of item, price, geographic location, quantity, shipping costs, etc.) Using this information, the user resale information module 208 may access the generated rules associated with resale transactions to determine and generate user transaction information relevant to the user's transaction. For example, the user transaction information may include a recommendation which may result in a more successful transaction (e.g., a recommendation to provide an image of the item being sold, a recommendation to revise a description of an item being sold in a particular manner, a recommendation to wait until after October to purchase a textbook for a lower price, a recommendation to purchase an item now because the price will increase in the future, a recommendation to purchase the item because it can likely be resold for a higher value in the future, a recommendation to purchase another similar item being sold for a lower price instead, a recommendation to change a categorization of the item to improve the chances of a sale of an item, etc.).

Figure 4:
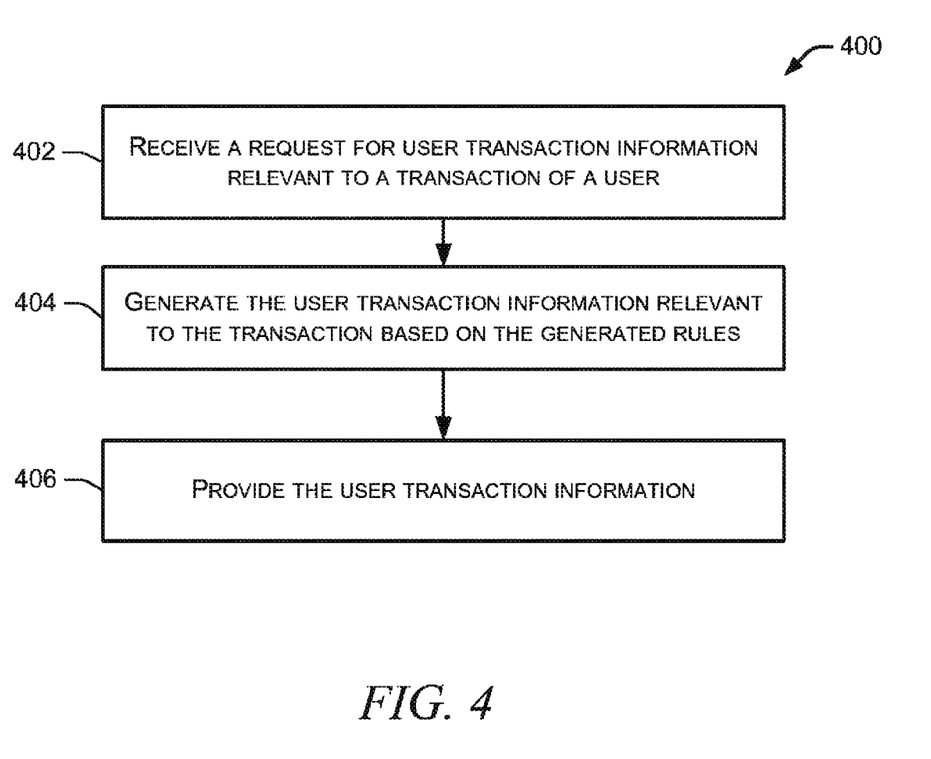
FIG. 4 is a flow chart showing an example method of providing user transaction information in response to a request, according to some embodiments.

FIG. 4 is a flow chart showing an example method 400 of providing user transaction information in response to a request. The method 400 may be performed using the reseller analysis system 200, as shown in FIG. 2.

In operation 402, the user resale information module 208 may receive a request for user transaction information relevant to a transaction of a user. The request may be received from a client device of the user. The request may be received at any point during a transaction of the user. For example, the request may be received when the user is creating an advertisement for an item the user is trying to sell through the online publication system, when the user is viewing an advertisement for an item the user is considering purchasing though the online publication system, and the like. The request may be received in any manner. In some embodiments, the request may be received when the user clicks a link allowing the request to be sent from the client device to the user resale information module 208.

In operation 404, the user resale information module 208 may generate user transaction information relevant to the user's transaction based on the generated rules associated with resale transactions. In some embodiments, the user transaction information may be relevant to the point in the transaction when the request was sent. The user transaction information may be generated in the manner described in operation 310 of FIG. 3.

In operation 406, the user resale information module 208 may provide the generated user transaction information to the user. As described above, the user transaction information may be provided to the user in any manner.

In some embodiments, the user transaction information may be provided to a user for a payment (e.g., commercial or proprietary currency). For example, the user may register for services provided by the reseller analysis system 200 in exchange for a fee paid in any manner (e.g., payment per request for user transaction information, monthly fee, etc.). In some embodiments, the payment for services may be managed by the payment applications 122, as shown in FIG. 1.

Figure 5:
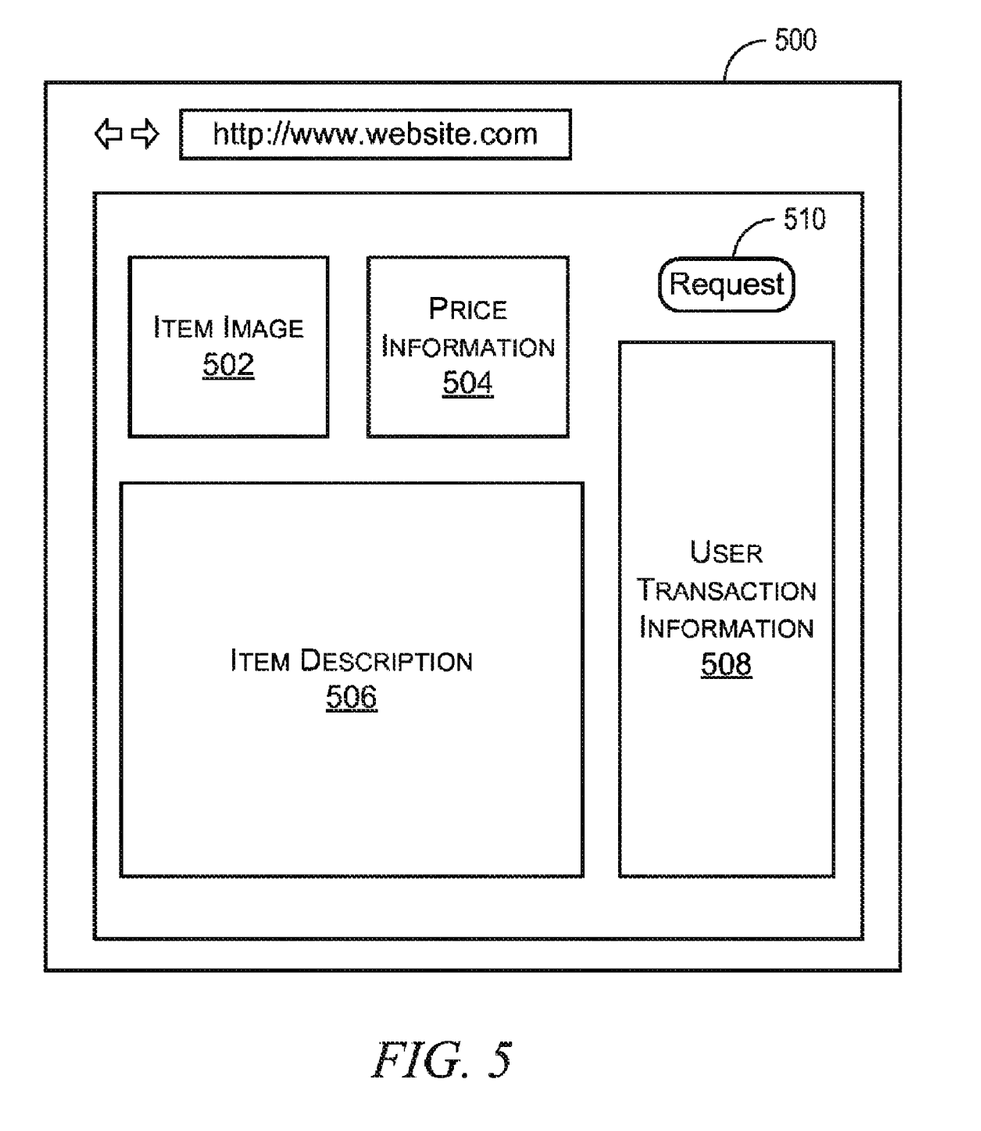
FIG. 5 is an interface diagram of an example user interface for providing user transaction information, according to some embodiments.

FIG. 5 is an interface diagram of an example user interface 500 for providing user transaction information. The user interface 500 may be associated with an advertisement of an item being sold or being purchased by a user through the online publication system. The user interface 500 may include an item image 502 of the item, price information 504 of the item, and an item description 506 of the item. The user interface 500 may also include user transaction information 508 relevant to the item transaction. The user transaction information 508 may be provided automatically or in response to a request submitted by a user using the request button 510.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
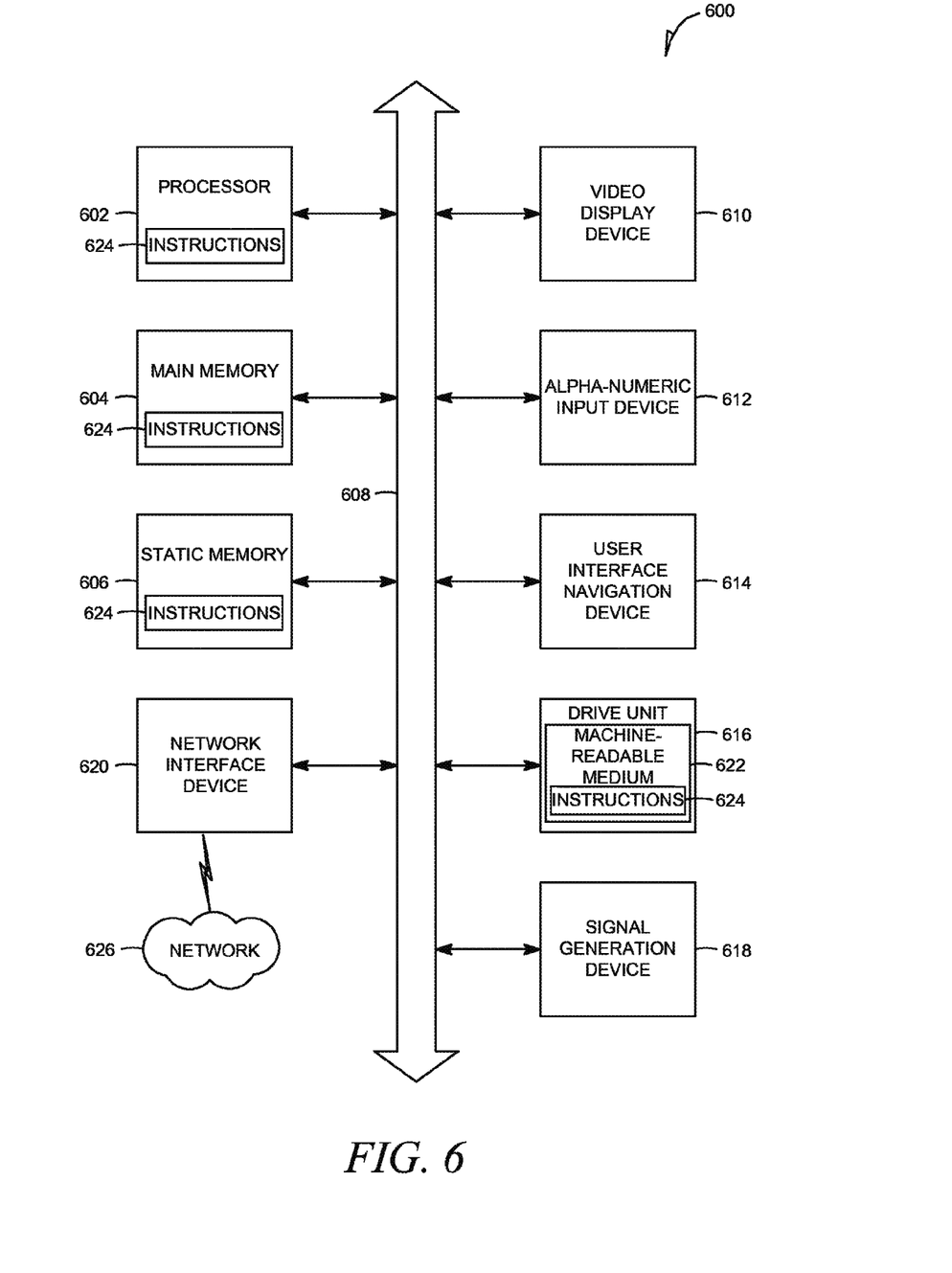
FIG. 6 is a block diagram of a machine in the example form of a computer system within which a set of instructions for causing the machine to perform any one or more of the methodologies discussed herein may be executed, according to some embodiments.

FIG. 6 is a block diagram of a machine in the example form of a computer system 600 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes a processor 602 (e.g., a central processing unit (CPU), a graphics processing unit (GPU) or both), a main memory 604, and a static memory 606, which communicate with each other via a bus 608. Computer system 600 may further include a video display device 610 (e.g., a liquid crystal display (LCD) or a cathode ray tube (CRT)). Computer system 600 also includes an alphanumeric input device 612 (e.g., a keyboard), a user interface (UI) navigation device 614 (e.g., a mouse), a disk drive unit 616, a signal generation device 618 (e.g., a speaker) and a network interface device 620.

Disk drive unit 616 includes a machine-readable medium 622 on which is stored one or more sets of data structures and instructions 624 (e.g., software) embodying or utilized by any one or more of the methodologies or functions described herein. Instructions 624 may also reside, completely or at least partially, within main memory 604, within static memory 606, and/or within processor 602 during execution thereof by computer system 600, main memory 604 and processor 602 also constituting machine-readable media.

While machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present technology, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Instructions 624 may further be transmitted or received over a communications network 626 using a transmission medium. Instructions 624 may be transmitted using network interface device 620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the technology. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. An electronic commerce system comprising:
    a hardware-implemented transaction information management module configured to receive electronic commerce transaction information associated with a plurality of electronic commerce transactions occurring using the electronic commerce system;
    a hardware-implemented resale information analysis module in communication with the transaction information management module and configured to:
        identify a set of currently pending or completed resale transactions from the plurality of electronic commerce transactions using the electronic commerce transaction information including identifying the set of currently pending or completed resale transactions based on resale criteria capable of indicating a sale of an item by an entity that previously purchased the item using the electronic commerce transaction system, and generate a set of rules associated with resale transactions including generating the set of rules based on the electronic commerce transaction information associated with the set of currently pending or completed resale transactions; and
    a hardware-implemented user resale information module configured to, based on the set of rules, provide user transaction information relevant to a currently pending transaction associated with a user.

2. The electronic commerce system of claim 1, wherein the electronic commerce transaction information includes values of items bought or sold during the plurality of electronic commerce transactions.

3. The electronic commerce system of claim 1, wherein the user transaction information is relevant to a potential sale or a potential purchase of an item.

4. The electronic commerce system of claim 3, wherein the user transaction information includes a recommendation relevant to the potential sale or the potential purchase of the item.

5. The electronic commerce system of claim 4, wherein the recommendation indicates whether to complete the potential sale or the potential purchase of the item.

6. The electronic commerce system of claim 1, wherein the user resale information module is further configured to receive from the user a request for the user transaction information, the user transaction information being provided in response to the request.

7. The electronic commerce system of claim 1, wherein the resale information analysis module is further configured to determine a user commonality between user accounts on the electronic commerce system, the set of resale transactions being identified based on the user commonality.

8. The electronic commerce system of claim 1, wherein the set of rules associated with the resale transactions includes rules indicating optimal times to buy or sell particular items.

9. The electronic commerce system of claim 1, wherein the resale information analysis module is further configured to identify the set of resale transactions based on a category associated with each transaction of the set of resale transactions.

10. The electronic commerce system of claim 1, wherein the set of currently pending or completed resale transactions includes a resale transaction of a first item associated with a first description and being sold by a first entity, the first item previously purchased by the first entity through a purchase transaction associated with a second description of the first item, the second description being different than the first description.

11. A computer-implemented method comprising:
    receiving, at an electronic commerce system, electronic commerce transaction information associated with a plurality of electronic commerce transactions occurring using the electronic commerce system;

identifying, using a processor at the electronic commerce system, a set of currently pending or completed, resale transactions from the plurality of electronic commerce transactions using the electronic commerce transaction information including identifying the set of currently pending or completed resale transactions based on resale criteria capable of indicating a sale of an item by an entity that previously purchased the item using the electronic commerce transaction system;

generating a set of rules associated with resale transactions including generating the set of rules based on the electronic commerce transaction information associated with the set of currently pending or completed resale transactions; and based on the set of rules, providing user transaction information relevant to a currently pending transaction associated with a user.

12. The computer-implemented method of claim 11, wherein receiving the electronic commerce transaction information includes receiving values of items bought or sold during the plurality of electronic commerce transactions.

13. The computer-implemented method of claim 11, wherein providing the user transaction information includes providing transaction information being relevant to a potential sale or a potential purchase of an item.

14. The computer-implemented method of claim 13, wherein providing the user transaction information includes providing a recommendation relevant to the potential sale or the potential purchase of the item.

15. The computer-implemented method of claim 14, wherein the recommendation indicates whether to complete the potential sale or the potential purchase of the item.

16. The computer-implemented method of claim 11, further comprising:

receiving, from the user, a request for the user transaction information, the user transaction information being provided in response to the request.

17. The computer-implemented method of claim 11, further comprising:

determining a user commonality between user accounts on the electronic commerce system, the set of resale transactions being identified based on the user commonality.

18. The computer-implemented method of claim 11, wherein generating the set of rules associated with the resale transactions includes generating rules indicating optimal manners of displaying an item being sold.

19. A computer-readable storage medium storing instructions which, when executed by one or more processors, cause the one or more processors to perform operations, comprising:

receiving, at an electronic commerce system, electronic commerce transaction information associated with a plurality of electronic commerce transactions occurring using the electronic commerce system;

identifying a set of currently pending or completed resale transactions from the plurality of electronic commerce transactions using the electronic commerce transaction information including identifying the set of currently pending or completed resale transactions based on resale criteria capable of indicating a sale of an item by an entity that previously purchased the item using the electronic commerce transaction system;

generating a set of rules associated with resale transactions including generating the set of rules based on the electronic commerce transaction information associated with the set of currently pending or completed resale transactions; and based on the set of rules, providing user transaction information relevant to a currently pending transaction associated with a user.

20. The computer-readable storage medium of claim 19, wherein the electronic commerce transaction information includes values of items bought or sold during the plurality of electronic commerce transactions.

21. The computer-readable storage medium of claim 19, wherein the user transaction information is relevant to a potential sale or a potential purchase of an item.

22. The computer-readable storage medium of claim 19, wherein the set of rules associated with the resale transactions includes rules indicating optimal values at which to buy or sell particular items.

* * * * *

UNITED STATES PATENT AND TRADEMARK OFFICE
CERTIFICATE OF CORRECTION

PATENT NO. : 9,626,682 B2
APPLICATION NO. : 13/627559
DATED : April 18, 2017
INVENTOR(S) : Sundaresan et al.

Page 1 of 1

It is certified that error appears in the above-identified patent and that said Letters Patent is hereby corrected as shown below:

In Column 13, Line 4, in Claim 11, delete "completed," and insert --completed-- therefor Signed and Sealed this
Tenth Day of July, 2018

Andrei Iancu
*Director of the United States Patent and Trademark Office*